United States Patent
Tsai

(10) Patent No.: US 8,608,354 B2
(45) Date of Patent: Dec. 17, 2013

(54) REMOTE CONTROL FOR BICYCLE HEADLIGHT AND REAR LIGHT

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 66 days.

(21) Appl. No.: 13/448,361

(22) Filed: Apr. 16, 2012

(65) Prior Publication Data

US 2013/0272004 A1  Oct. 17, 2013

(51) Int. Cl.
*B62J 6/00* (2006.01)
*F21V 33/00* (2006.01)

(52) U.S. Cl.
USPC .............. 362/474; 362/473; 362/475

(58) Field of Classification Search
USPC ............ 362/473–476, 20, 396, 183, 191
See application file for complete search history.

(56) References Cited

U.S. PATENT DOCUMENTS

| 7,944,344 B2 * | 5/2011 | Chen ........................... 340/432 |
| 2003/0137850 A1 * | 7/2003 | Liaw et al. ................... 362/474 |

* cited by examiner

*Primary Examiner* — Anne Hines
*Assistant Examiner* — Jose M Diaz

(57) ABSTRACT

A remote control for bicycle headlight and rear light is provided a dome including an opening; an actuation member including a resilient button disposed through the opening, and a flange extending outwardly from the button to engage an inner surface of the dome; a controller including a control unit, a switch on the control unit and engaging the button, and a transmitter within the control unit; a battery engaging the control unit; and a bracket including a clamp and a seat at one end of the clamp, the seat releasably secured to the dome together to receive the actuation member, the controller, and the battery. The bracket is mounted on a handlebar by threadedly securing the clamp to a brake lever. A pressing of the button electrically connects the battery to the control unit so as to activate the transmitter to send out an IR light pulse.

4 Claims, 7 Drawing Sheets

REMOTE CONTROL FOR BICYCLE HEADLIGHT AND REAR LIGHT

BACKGROUND OF THE INVENTION

1. Field of the Invention

The invention relates to bicycle accessories and more particularly to a remote control mounted on a handlebar of a bicycle and adapted to send out a pulse of infrared (IR) light when a button of the remote control is pressed so that headlight can be turned on or off after a receiver associated with the headlight decoding and carrying out the command (e.g., on or off) and/or rear light can be turned on or off after a receiver associated with the rear light decoding and carrying out the command (e.g., on or off).

2. Description of Related Art

Bicycle headlights are conventionally releasably connected to handlebars, head tube or forks of a bicycle by a bracket. However, bracket failure or unwanted release of a headlight from a bracket can lead to the headlight falling to the ground.

Some typical headlights comprise a battery pack intended to be mounted remotely from a light unit, e.g. in a bottle cage or by strapping to a bicycle frame. However, this requires a long interconnection between the battery pack and the light unit, which is inconvenient. Further, the interconnection may be unsightly due to wiring.

Thus, the need for improvement still exists.

SUMMARY OF THE INVENTION

It is therefore one object of the invention to provide a remote control comprising a dome comprising an opening; an actuation member comprising a resilient button disposed through the opening, and a flange extending outwardly from the button to engage with an inner surface of the dome; a controller comprising a control unit, a switch disposed on the control unit and engaging with a bottom of the button, and a transmitter within the control unit; a battery engaged with the control unit; and a bracket comprising a clamp and a seat formed at one end of the clamp, the seat being releasably secured to the dome together to receive the actuation member, the controller, and the battery; wherein the bracket is mounted on a handlebar by threadedly securing the clamp to a brake lever; and wherein a pressing of the button electrically connects the battery to the control unit so as to activate the transmitter to send out a pulse of infrared light.

The above and other objects, features and advantages of the invention will become apparent from the following detailed description taken with the accompanying drawings.

DETAILED DESCRIPTION OF THE INVENTION

Figure 1:
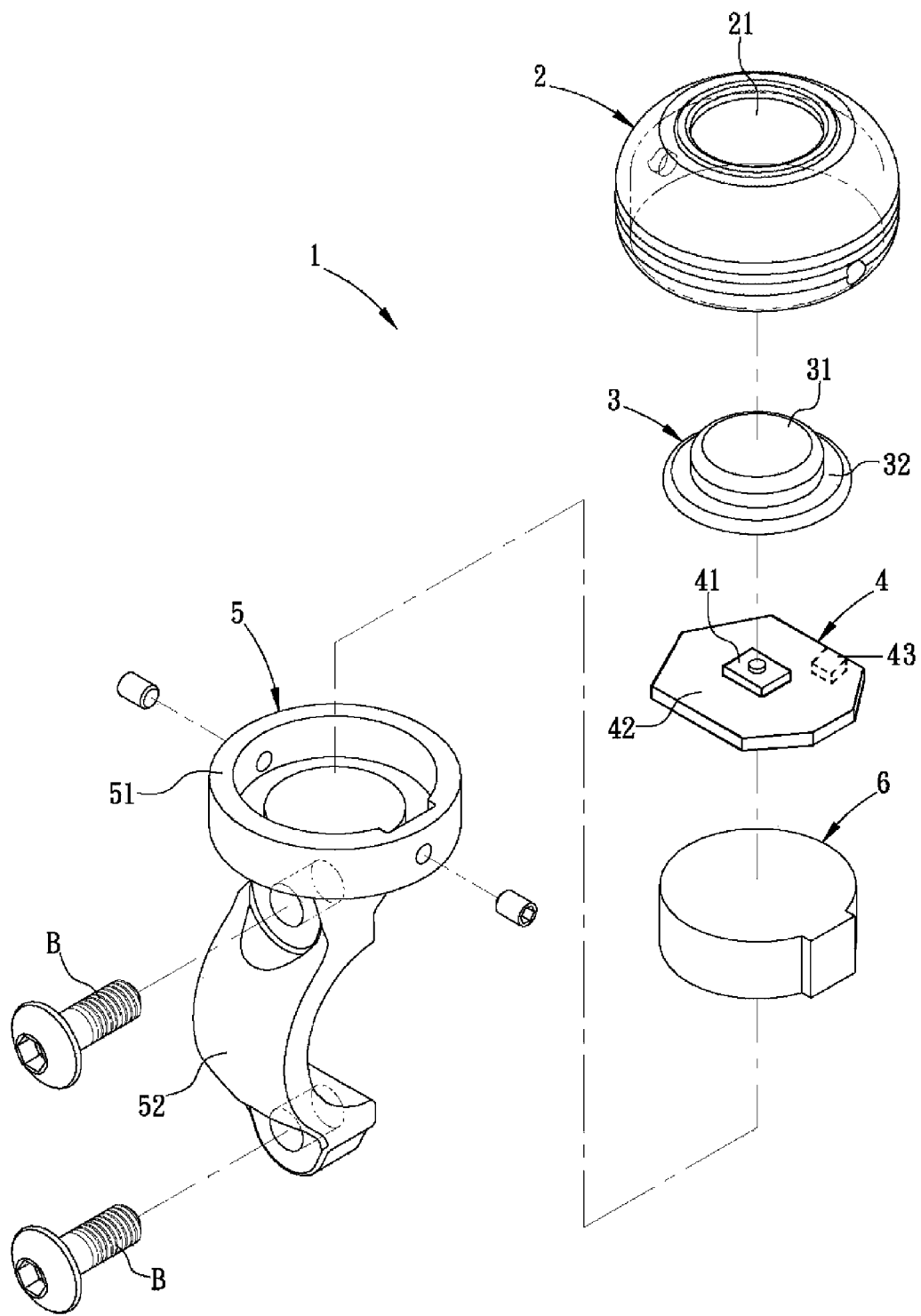
FIG. 1 is an exploded view of a remote control for bicycle headlight and rear light according to a first preferred embodiment of the invention.
Figure 2:
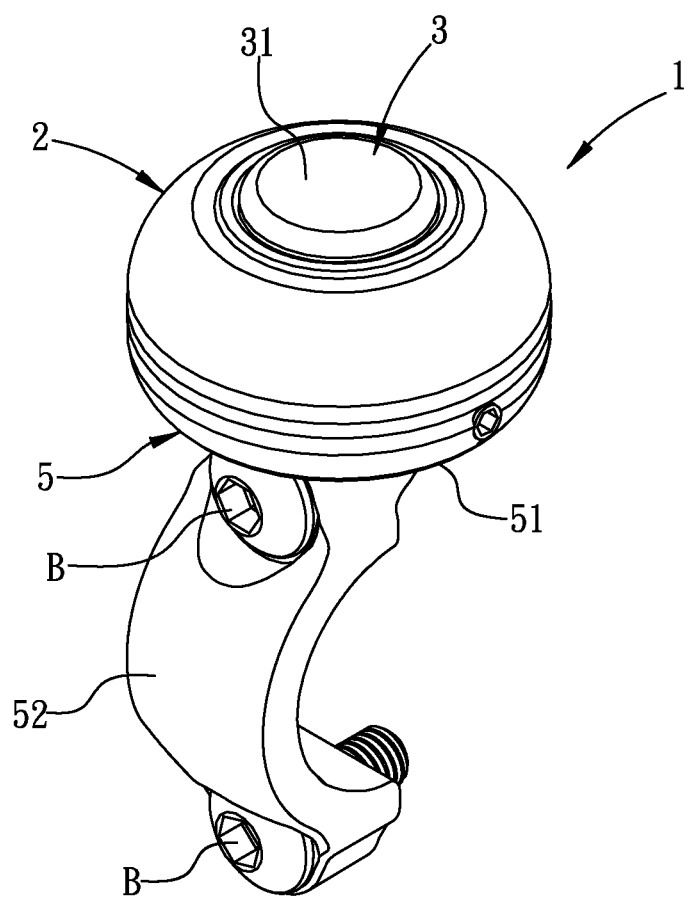
FIG. 2 is a perspective view of the assembled remote control.
Figure 3:
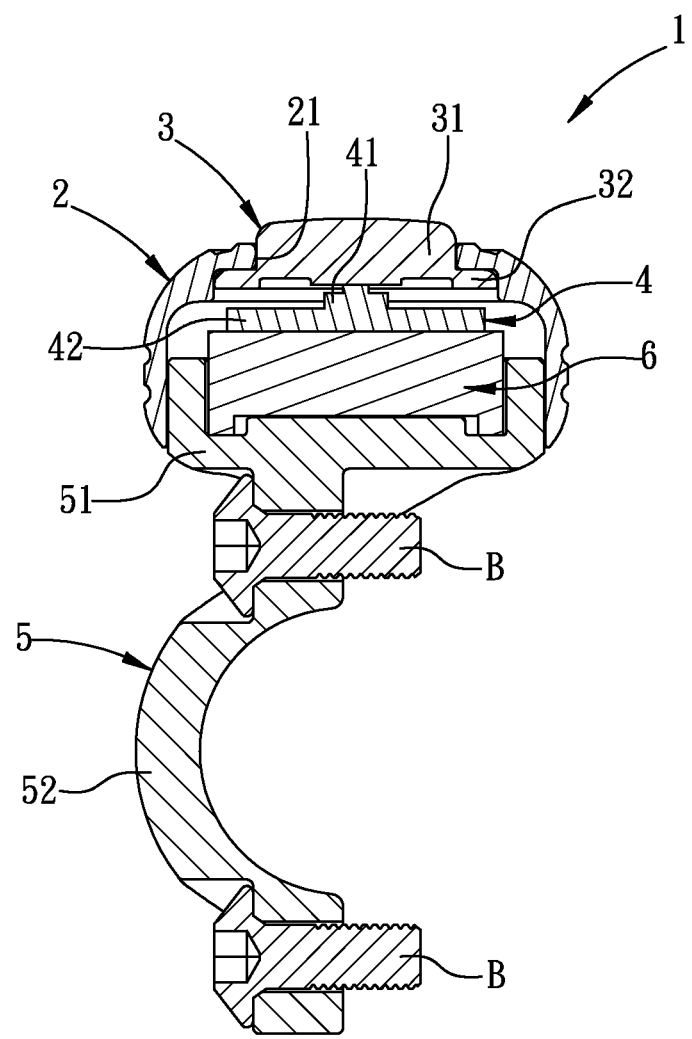
FIG. 3 is a longitudinal sectional view of the remote control of FIG. 2.
Figure 4:
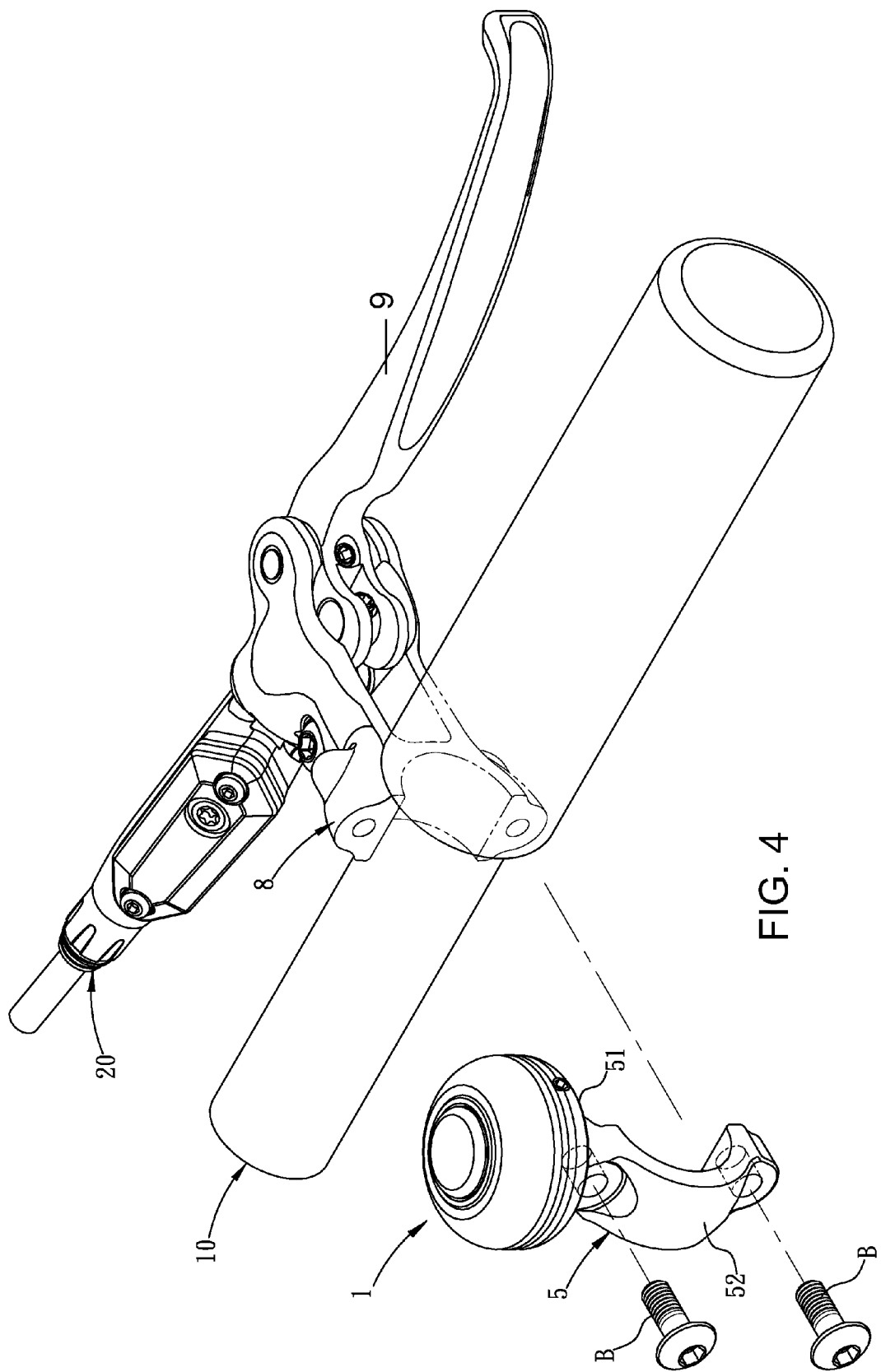
FIG. 4 is a perspective view of the remote control of FIG. 2 to be mounted on a handlebar by threadedly securing to a clamping member of a brake lever.
Figure 5:
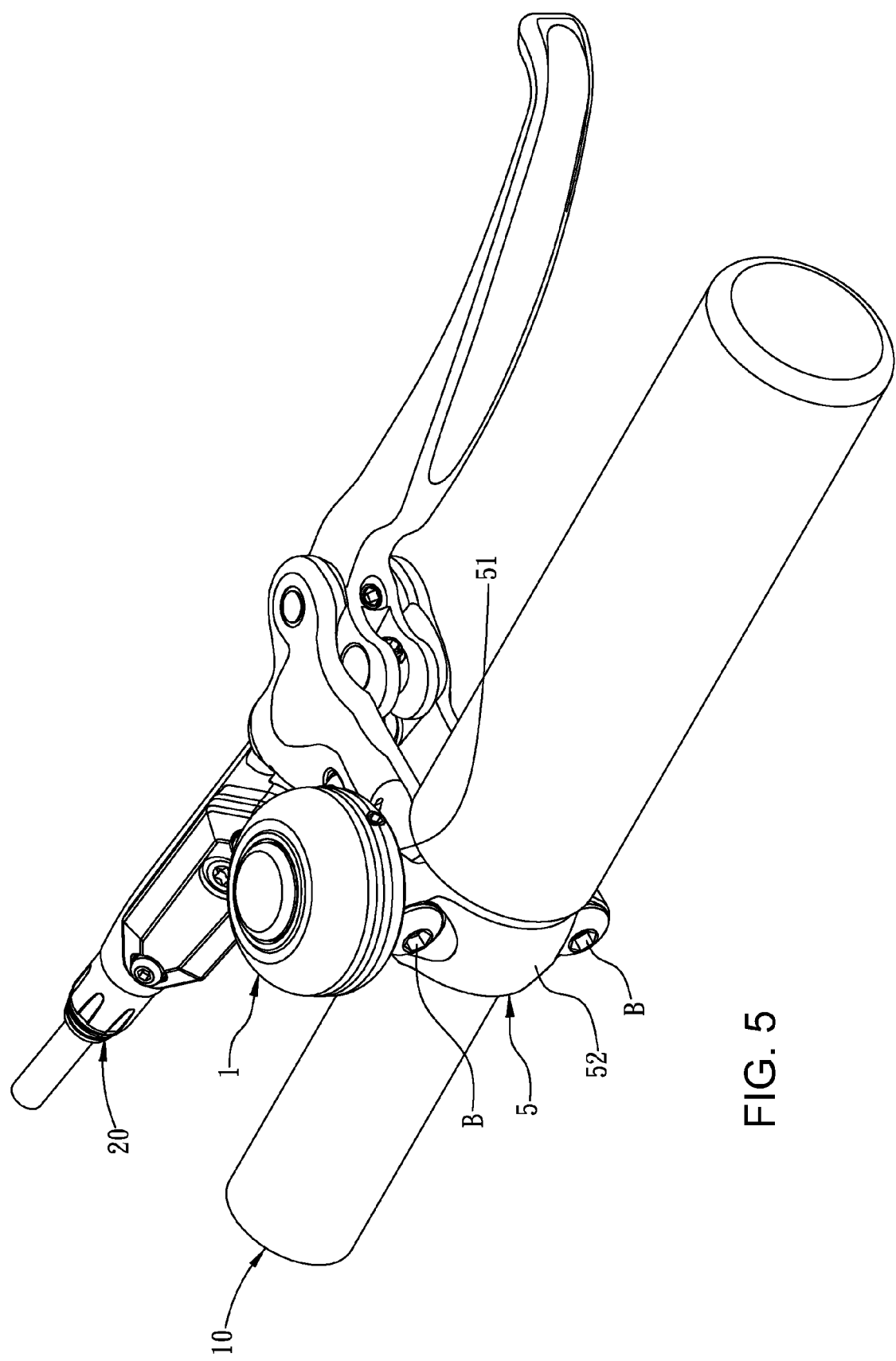
FIG. 5 is a perspective view of the assembled remote control and the handlebar.

Referring to FIGS. 1 to 5, a remote control 1 for bicycle headlight and rear light in accordance with a first preferred embodiment of the invention comprises the following components as discussed in detail below.

A dome 2 comprises a top opening 21. An actuation member 3 comprises a resilient, circular button 31 disposed in the opening 21 and projecting out of the opening 21, and an annular flange 32 extending outwardly from the button 31 to be engaged with an inner surface of the dome 2. A plate shaped controller 4 comprises a control unit (e.g., implemented as a single integrated circuit chip as shown) 42, a switch 41 on a top center of the control unit 42, the switch 41 engaged with the bottom of the button 31, and a transmitter 43 within the control unit 42.

A short cylindrical battery (e.g., disposable battery or rechargeable battery) 6 engaged with a bottom of the control unit 42. A bracket 5 comprises a curved clamp 52 and a cup shaped seat 51 formed at one end of the clamp 52, the seat 51 being releasably secured to the dome 2 to receive the actuation member 3, the controller 4, and the battery 6 and hold same in place.

The remote control 1 can be mounted on a handlebar 10 of a bicycle by driving two fasteners B through both ends of the clamp 52 into both ends of a curved clamping member 8 of a brake lever 9. Thus, the bracket 5 is secured to the handlebar 10. The brake lever 9 is in turn attached to a housing 20 of a hydraulic brake of the bicycle.

In one preferred configuration, a rider may press the button 31 to electrically connect the battery 6 to the control unit 42 which in turn activates the transmitter 43 to send out a pulse of infrared (IR) light. The IR light pulse represents a binary code that corresponds to a certain command such as power on. A receiver (not shown) associated with a headlight (not shown) of a bicycle (not shown) passes the binary code to a microprocessor (not shown) associated with the receiver. The microprocessor then decodes the binary code and carries out the command. As a result, the headlight is turned on.

The rider may press the button 31 again within a first immediately next predetermined period of time. A receiver (not shown) associated with a rear light (not shown) of the bicycle passes the binary code to a microprocessor (not shown) associated with the receiver. The microprocessor then decodes the binary code and carries out the command. As a result, the rear light is turned on.

The rider may press the button 31 again within a second immediately next predetermined period of time. As a result, both the headlight and the rear light are turned on.

The rider may press the button 31 again within a third immediately next predetermined period of time. As a result, both the headlight and the rear light are turned off.

Figure 6:
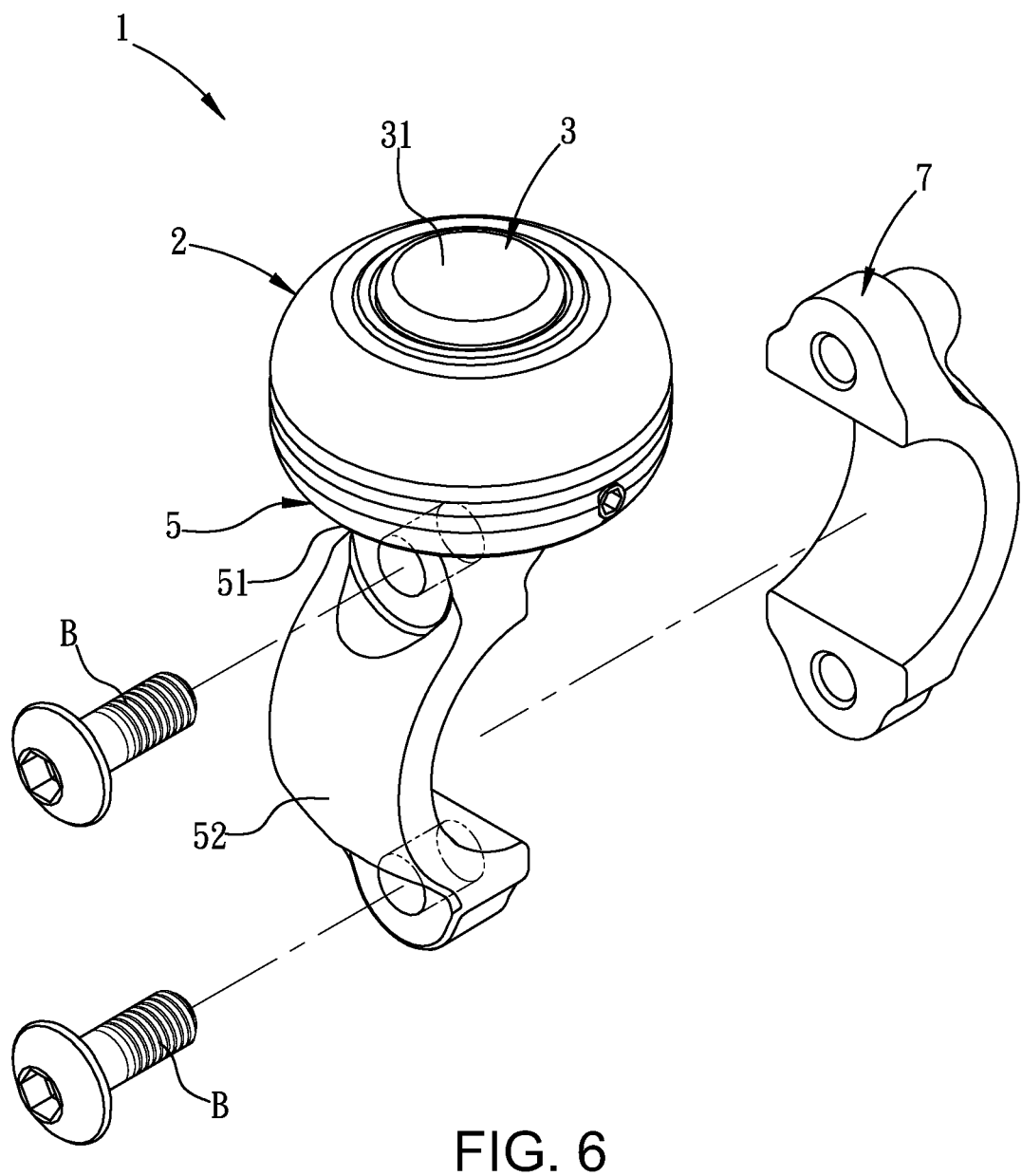
FIG. 6 is an exploded view of a remote control for bicycle headlight and rear light according to a second preferred embodiment of the invention.
Figure 7:
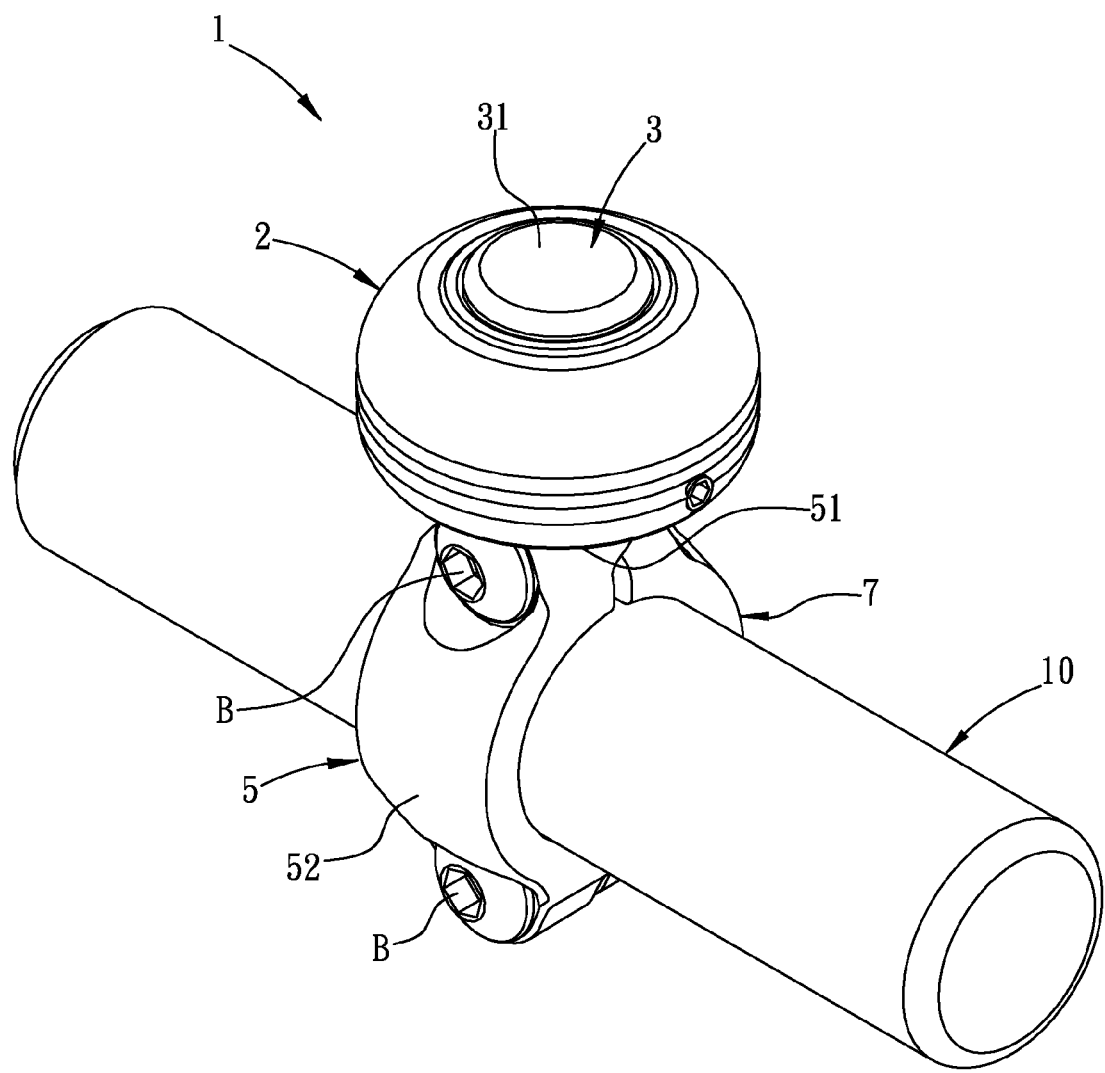
FIG. 7 is a perspective view of the remote control of FIG. 6 mounted on a bicycle handlebar.

Referring to FIGS. 6 and 7, a remote control 1 for bicycle headlight and rear light in accordance with a second preferred embodiment of the invention is shown. The characteristics of the second preferred embodiment are substantially the same as that of the first preferred embodiment except the following:

A curved second clamp 7 complementary to the clamp 52 is provided. The second clamp 7 and the clamp 52 can be threadedly secured together by using fasteners B to mount the remote control 1 on a handlebar 10.

While the invention has been described in terms of preferred embodiments, those skilled in the art will recognize that the invention can be practiced with modifications within the spirit and scope of the appended claims.

What is claimed is:

1. A remote control comprising:
   a dome comprising an opening;
   an actuation member comprising a resilient button disposed through the opening, and a flange extending outwardly from the button to engage with an inner surface of the dome;
   a controller comprising a control unit, a switch disposed on the control unit and engaging with the button, and a transmitter disposed within the control unit;
   a battery engaging with the control unit; and
   a bracket comprising a clamp and a seat formed at one end of the clamp, the seat being releasably secured to the dome together to receive the actuation member, the controller, and the battery;
   wherein the bracket is mounted on a handlebar by threadedly securing the clamp to a brake lever; and
   wherein a pressing of the button electrically connects the battery to the control unit so as to activate the transmitter to send out a pulse of infrared (IR) light.

2. The remote control for bicycle headlight and rear light of claim 1, wherein the control unit is a single integrated circuit chip.

3. The remote control for bicycle headlight and rear light of claim 1, wherein the battery is a disposable battery.

4. The remote control for bicycle headlight and rear light of claim 1, wherein the battery is a rechargeable battery.

* * * * *